United States Patent [19]

Bauman et al.

[11] Patent Number: 4,559,369
[45] Date of Patent: Dec. 17, 1985

[54] SILICONE FOAM, WATER-BASED, AEROSOL COMPOSITION

[75] Inventors: Therese M. Bauman; Chi-long Lee; James A. Rabe, all of Midland, Mich.

[73] Assignee: Dow Corning Corporation, Midland, Mich.

[21] Appl. No.: 665,223

[22] Filed: Oct. 26, 1984

[51] Int. Cl.$^4$ .............................. C08J 9/28; C08J 9/30
[52] U.S. Cl. ........................................ 521/98; 521/64; 521/68; 521/82; 521/88; 521/91; 521/154; 521/78
[58] Field of Search ..................... 521/78, 154, 98, 64, 521/68, 88, 91

[56] References Cited

U.S. PATENT DOCUMENTS

| | | | |
|---|---|---|---|
| 3,830,760 | 9/1984 | Bengtson | 260/2.5 BD |
| 3,912,665 | 10/1975 | Spitzer et al. | 521/78 |
| 3,912,666 | 10/1975 | Spitzer et al. | 521/78 |
| 3,912,667 | 10/1975 | Spitzer et al. | 521/78 |
| 4,229,548 | 10/1980 | Sattlegger et al. | 521/110 |
| 4,328,319 | 5/1982 | Osipow et al. | 521/78 |
| 4,391,765 | 7/1983 | Lee et al. | 264/26 |
| 4,391,921 | 7/1983 | Johnson et al. | 521/66 |
| 4,422,877 | 12/1983 | Spitzer et al. | 521/78 |
| 4,473,667 | 9/1984 | Sands | 521/122 |

FOREIGN PATENT DOCUMENTS 2909443  9/1980  Fed. Rep. of Germany .

Primary Examiner—Morton Foelak
Attorney, Agent, or Firm—Edward C. Elliott

[57] ABSTRACT

A composition useful in producing an open-cell, elastomeric silicone foam combines a silicone oil-in-water emulsion, which forms an elastomer upon removal of the water, with an aerosol propellant. When the composition is discharged to atmospheric pressure, a froth is formed. Removing water from the froth yields an open-cell foam. The froth is stabilized by surfactants, thickeners, or froth stabilizers selected from fibers or lauryl alcohol.

16 Claims, No Drawings

SILICONE FOAM, WATER-BASED, AEROSOL COMPOSITION

BACKGROUND OF THE INVENTION

1. Field of the Invention

This invention relates to compositions of room temperature curing, elastomeric, silicone water-based emulsions, froth stabilizers, and aerosol propellants packaged under superatmospheric pressure which convert to an open-cell foam when released to atmospheric pressure and dried.

2. Background Information

Bengtson, in U.S. Pat. No. 3,830,760, issued Aug. 20, 1974, discloses a process for the manufacture of a foamable composition which comprises forming a mixture of a polymer or polymer precursor, curable on contact with the atmosphere, and a polymer soluble inert blowing agent under pressure. His broad list of polymers includes silicone. His examples show polyurethanes which are mixed and then transferred to aerosol containers. Dispensing the ingredients from the container yields a froth which then cures from exposure to the atmosphere to produce a closed-cell foam.

Sands, in patent application Ser. No. 391,899, now U.S. Pat. No. 4,473,667, filed June 25, 1982, assigned to the assignee of the instant application, discloses a method of producing a silicone elastomeric foam- from an aqueous silicone emulsion suitable to provide an elastomeric product upon removal of the water. He mechanically generates a stable froth, then removes the water to form a cured elastomeric foam. He teaches drying by placing in an oven or air drying. Lee et al. in U.S. Pat. No. 4,391,765, issued July 5, 1983, teach a simplified method of manufacturing a silicone elastomeric foam comprising mechanically generating a stable froth of an aqueous emulsion, while adding surfactant and thickener, then exposing the stable froth to microwave energy to remove the water. Johnson, in U.S. Pat. No. 4,391,921, issued July 5, 1983, disclose a method of producing open-cell sponge by freezing a silicone emulsion, thawing the frozen article, and drying until the water is removed.

Hagen et al. in German OLS No. 2,909,443, published Sept. 18, 1980, disclose a process for preparing a room temperature curing silicone foam. A one-component silicone material is mixed with a low boiling solvent and placed in a bag in a pressure package. A surface pressure, acting on the bag, squeezes the mixture out through a valve to form the foam.

Sattlegger et al. in U.S. Pat. No. 4,229,548, issued Oct. 21, 1980, describe a process of producing a foam. A hydroxyl endblocked polydiorganosiloxane and silicon-containing crosslinking agent are placed into the inner container of a two-container pack. The mixture may also contain a gas. The inner flexible container is then placed under pressure by pressurizing the space between the inner and outer containers. Upon opening the valve, the contents form a uniform closed cell foam, which then cures.

SUMMARY OF THE INVENTION

The composition of this invention, when released from an aerosol container, produces an open-cell, elastomeric foam. The composition, comprising silicone oil-in-water emulsion (optionally lauryl alcohol or fibers), which forms an elastomer upon removal of the water, is combined with a blowing agent in a closed container. When the contents are discharged, a froth is formed. Removing the water from the froth gives an elastomeric foam which has open cells.

It is an object of this invention to produce a composition which is storable in an aerosol container and which, when released from the aerosol container, forms a froth which converts to an open-cell, elastomeric silicone foam upon removal of water.

It is an object of this invention to produce a composition adapted to produce an open-cell, elastomeric foam, using an aerosol method to generate a froth, the froth being stabilized by fibers. By using electrically conductive fibers, an electrically conductive foam can be produced.

It is an object of this invention to produce a composition adapted to produce an elastomeric foam having small, uniform, open cells, using an aerosol method to generate a froth, the froth being stabilized by lauryl alcohol.

DESCRIPTION OF THE INVENTION

This invention relates to a composition, under superatmospheric pressure, consisting of a mixture of (A) 100 parts by weight of silicone emulsion which is an aqueous, oil-in-water emulsion that cures upon drying at ambient temperature to an elastomeric film, the emulsion comprising silicone polymer, surfactant, water, and optionally filler, curing agent, thickener, or mixtures thereof, the emulsion having a solids content of from 35 to 80 percent by weight, (B) from 0 to 2 parts by weight of lauryl alcohol, (C) from 0 to 10 parts by weight of fibers having a diameter of from 1 to 10 micrometers and a length of from 30 micrometers to 10 millimeters with a length to diameter ratio of greater than 10 to 1, and (D) sufficient aerosol propellant selected from the group consisting of nitrogen, nitrous oxide, isobutane, propane, dichlorodifluoromethane, trichlorofluoromethane, and mixtures thereof, to convert said composition to a froth when released to atmospheric pressure at 25° C., the froth producing an open-cell, elastomeric foam upon removal of water.

Methods of producing silicone elastomers have been developed which use an oil-in-water emulsion. The oil-in-water emulsion consists of dispersed particles of an anionically stabilized polydiorganosiloxane and a continuous phase of water. Several methods have been developed for further processing of the basic polydiorganosiloxane emulsion so that it forms an elastomer when the water is removed from it. These elastomer-producing emulsions are further modified in the present invention by mixing them in an aerosol container with an aerosol propellant or blowing agent so that a froth is formed when the contents are released to the atmosphere. The composition in the container is formulated with thickener, surfactant, froth stabilizer, or combination thereof, so that the froth which is formed upon release from the container is stable; that is, it remains as a froth while the water is removed. Upon removal of the water from the froth, an open-cell, elastomeric foam results. The open-cell foam produced from the composition of this invention is made up of cells resulting from ruptured bubbles, with very thin, partial walls between the cells in relation to the cell diameter. A majority of the walls between the cells are broken so that the foam is porous; that is, gases or liquids readily pass through the foam if under slight pressure. The foam has the heat stability and weatherability typically found with silicone elastomers.

The elastomeric polymer which forms the foam of this invention comes from the oil-in-water emulsion of (A). Emulsion (A) has to be stable so that the mixture has a useful shelf life, for example, 1 year. Emulsion (A) has to be convertible to an elastomer upon removal of the water at room temperature. The emulsion is required to have a solids content of from 35 to 80 percent by weight for use in this invention. Solids content is the percent by weight of non-volatile material remaining in a 2 g sample of the emulsion after it has been heated for 1 hour at 150° C. in an air-circulating oven. The sample is in an aluminum foil dish 60 mm in diameter and 15 mm deep. A solids content of 35 percent is considered the lower limit which can be used because of the excessive shrinkage of the froth upon drying and the increasing difficulty in producing a stable froth with emulsions of lower solids content. The upper limit of the solids content is determined by the requirement of an oil-in-water emulsion. About 20 percent by weight of water is necessary in order to maintain the emulsion because of the tendency of the emulsion to thicken and/or gel on storage when lower amounts of water are present.

There are many different types of elastomeric silicone emulsions which have the required characteristic so that they can be used as (A). A silicone emulsion having a dispersed phase of an anionically stabilized hydroxylated polydiorganosiloxane and a colloidal silica and a continuous phase of water in which the pH is 9 to 11.5 as described to Johnson et al. in U.S. Pat. No. 4,221,688, issued Sept. 9, 1980, is a preferred emulsion for use in this invention as (A). U.S. Pat. No. 4,221,688 is hereby incorporated by reference to disclose the emulsion and method of manufacture of such an emulsion. Hydroxylated polydiorganosiloxanes are those which impart elastomeric property to the product obtained after removal of the water from the emulsion. They should have a weight average molecular weight of at least 5,000, preferably in a range of 200,000 to 700,000. The organic radicals of the hydroxylated polydiorganosiloxane can be monovalent hydrocarbon radicals containing less than seven carbon atoms per radical and 2-(perfluoroalkyl)ethyl radicals containing less than seven carbon atoms per radical. The hydroxylated polydiorganosiloxanes preferably contain at least 50 percent methyl radicals with polydimethylsiloxane being preferred. The hydroxylated polydiorganosiloxanes are preferably those which contain about 2 silicon-bonded hydroxyls per molecule.

The most preferred hydroxylated polydiorganosiloxanes are those prepared by the method of anionic emulsion polymerization described by Findley et al. in the U.S. Pat. No. 3,294,725 which is hereby incorporated by reference to show the methods of polymerization and to show the hydroxylated polydiorganosiloxane in emulsion. Another method of preparing hydroxylated polydiorganosiloxane is described by Hyde et al. in U.S. Pat. No. 2,891,920 which is hereby incorporated by reference to show the hydroxylated polydiorganosiloxanes and their method of preparation.

Another emulsion useful as (A) of this invention is described in Saam, U.S. Pat. No. 4,244,849 issued Jan. 13, 1981, hereby incorporated by reference to disclose the emulsion and method of manufacture of such an emulsion. This emulsion comprises a continuous water phase and an anionically stabilized dispersed silicone phase which is a graft copolymer of a hydroxyl endblocked polydiorganosiloxane and an alkali metal silicate which is present in the continuous water phase. The emulsion has a pH within the range from 8.5 to 12 inclusive. The hydroxyl endblocked polydiorganosiloxane useful in this embodiment is the same as that described above. The alkali metal silicates that are suitable are water soluble silicates, preferably employed as an aqueous solution. Preferred is sodium silicate in an amount of from 0.3 to 30 parts by weight for each 100 parts by weight of polydiorganosiloxane. During the preparation of the emulsion an organic tin salt is added to catalyze the reaction of the hydroxyl endblocked polydiorganosiloxane and the alkali metal silicate. A diorganotindicarboxylate is a preferred organic tin salt with from 0.1 to 2 parts by weight employed for each 100 parts by weight of polydiorganosiloxane. The preferred diorganotindicarboxylate is dioctyltindilaurate.

Another emulsion useful as (A) of this invention is described to Willing in U.S. Pat. No. 4,248,751, issued Feb. 3, 1981, hereby incorporated by reference to disclose the emulsion and its method of manufacture. For use in this invention, the emulsion includes the addition of colloidal silica. This emulsion is the emulsion produced by a process comprising emulsifying (5) a vinyl endblocked polydiorganosiloxane and (6) an organosilicon compound having silicon-bonded hydrogen atoms using water and surfactant to form an emulsion, adding a platinum catalyst and heating the emulsion to form a dispersed phase of crosslinked silicone elastomer, then adding colloidal silica. The vinyl endblocked polydiorganosiloxane (5) preferably is a polydiorganosiloxane terminated by triorganosiloxy groups and having two vinyl radicals per molecule, no silicon atom having more than one vinyl radical bonded thereto. The remaining organic radicals are preferably those with six carbon atoms or less with the preferred organic radicals being selected from the group consisting of methyl, ethyl, phenyl, and 3,3,3-trifluoropropyl radicals, at least 50 percent of the radicals being methyl radicals. The polydiorganosiloxane should have a viscosity of from 0.1 to 100 Pa·s at 25° C.

In this embodiment, the organosilicon compound (6) is one which contains silicon-bonded hydrogen atoms. This compound can be any compound or combination of compounds containing silicon-bonded hydrogen atoms useful as crosslinkers and providing an average of at least 2.1 silicon-bonded hydrogen atoms per molecule of (6) of at least 2.1. Such compounds are known in the art as illustrated to Polmanteer et al. in U.S. Pat. No. 3,697,473, issued Oct. 10, 1972, which is hereby incorporated by reference to show such organosilicon compounds. A preferred organosilicon compound is a mixture which consists essentially of (a) an organosiloxane compound containing two silicon-bonded hydrogen atoms per molecule and the organic radicals being selected from the group consisting of alkyl radicals having from 1 to 12 carbon atoms inclusive, phenyl, and 3,3,3-trifluoropropyl radicals, no silicon atom having bonded thereto more than one silicon-bonded hydrogen atom, and said organosiloxane (a) having no more than 500 silicon atoms per molecule, and (b) an organosiloxane compound containing at least 3 silicon-bonded hydrogen atoms per molecule, the organic radicals being selected from the group defined above for R', no silicon atom having bonded thereto more than one silicon-bonded hydrogen atom and said organosiloxane compound (b) having no more than 75 silicon atoms per molecule. This mixture is such that at least 10 percent of the silicon-bonded hydrogen atoms are derived from (a) or (b) and the combination of (a) and (b) provides 100 weight percent of the mixture. The organosilicon compound is preferably added in an amount such that there are present from 0.75 to 1.50 silicon-bonded hydrogen atoms in the compound (6) for each vinyl radical in the vinyl endblocked polydiorganosiloxane (5).

Another emulsion useful in part (A) of this invention is described to Saam et al. in U.S. Pat. No. 4,273,634, issued June 16, 1981, which is hereby incorporated by reference to show the emulsion and method of manufacture of an emulsion useful in this invention when colloidal silica is also present in the emulsion. The emulsion of this embodiment comprises an emulsion prepared by first forming a stabilized dispersion of hydroxyl endblocked polydiorganosiloxane containing sufficient vinyl substituted siloxane units to facilitate the crosslinking of the polydiorganosiloxane and having a weight average molecular weight of at least 5000. The preferred weight average molecular weight is in the range of from 200,000 to 700,000. The organic radicals of the hydroxyl endblocked polydiorganosiloxane can be monovalent hydrocarbon radicals containing less than seven carbon atoms per radical and 2-(perfluoroalkyl)ethyl radicals containing less than seven carbon atoms per radical. It is preferred that at least 50 percent of the radicals are methyl radicals with a preferred polydiorganosiloxane being a copolymer containing dimethylsiloxane units and methylvinylsiloxane units. The amount of vinyl-substituted siloxane units is not critical, typically about 0.03 to 0.06 mole percent of the vinyl-substituted siloxane units are preferred.

A preferred method of forming the stabilized dispersion is to prepare the polydiorganosiloxane by emulsion polymerization, preferably by the method of U.S. Pat. No. 3,294,725 cited above.

After the dispersion of hydroxyl endblocked polydiorganosiloxane containing vinyl substituted siloxane units has been made, it is treated to provide a crosslinking action by forming free radicals within the dispersed polydiorganosiloxane. Any of the methods known in the art to produce free radicals that will crosslink the polydiorganosiloxane can be employed in the present invention as long as the free radicals can be generated within the dispersed particles without breaking or coagulating the dispersion. Generally, crosslink-inducing radicals can be produced by energy activation of the polydiorganosiloxane directly or by energy activation of radical-producing agents dissolved in the droplets.

After the polydiorganosiloxane in the emulsion is crosslinked, colloidal silica is added to the emulsion, preferably in the form of an aqueous dispersion of colloidal silica. The amount of colloidal silica is not critical, up to 70 parts can be added with a preferred amount from about 10 to 25 parts by weight of colloidal silica per 100 parts by weight of polydiorganosiloxane.

Another emulsion useful in (A) of this invention is described in the patent application, Serial No. 624,545, titled "Polydiorganosiloxane Latex", by Huebner and Saam, filed on June 25, 1984, and having the same assignee, which is hereby incorporated by reference to describe the emulsion and its method of manufacture. In this method of producing an aqueous emulsion of crosslinked polydiorganosiloxane, a hydroxyl endblocked polydiorganosiloxane is mixed with a hydrolyzable silane having 3 or 4 hydrolyzable groups, a surface active anionic catalyst selected from the group consisting of a compound of the formula $R'C_6H_4SO_3H$ wherein $R'$ is a monovalent aliphatic hydrocarbon radical of at least 6 carbon atoms and a compound of the formula $R'OSO_2OH$ wherein $R'$ is as defined above, and sufficient water to form an oil-in-water emulsion. The mixture is immediately homogenized, then allowed to polymerize at a temperature of from about 15 to 30° C for at least 5 hours at a pH of less than 5 until a crosslinked polymer is formed. The crosslinked polymer emulsion is then neutralized to a pH of greater than 7 and reinforced by adding greater than 1 part by weight of colloidal silica sol or silsesquioxane.

At the present time, it is considered that stable, silicone oil-in-water emulsions which are convertible to an elastomer upon removal of the water at room temperature, and which have the required solids content, are suitable for use in the method of this invention.

The composition of this invention, consisting of a mixture of (A), (B), (C), and (D), must form a froth when it is released to atmospheric pressure. A froth is defined as a structure that will maintain its shape and does not collapse upon removal of water. A froth that will maintain its shape is obtained by use of froth stabilizers in the composition, such as additional surfactant, thickener, fibers, lauryl alcohol, or mixtures of these froth stabilizers. Preferred surfactants include anionic surfactants such as the salt of the surface active sulfonic acids used in the emulsion polymerization to form the hydroxyl endblocked polydiorganosiloxanes as shown in U.S. Pat. No. 3,294,725 cited above which is hereby incorporated by reference to show the surface active sulfonic acids and salts thereof. The alkali metal salts of the sulfonic acids are preferred, particularly the sodium salts. The sulfonic acid can be illustrated by aliphatically substituted benzenesulfonic acids, aliphatically substituted naphthalene sulfonic acids, aliphatic sulfonic acids, silylalkylsulfonic acids, and aliphatically substituted diphenylether sulfonic acids. Other anionic emulsifying agents can be used, for example, alkali metal sulforicinaleates, sulfonated glyceryl esters of fatty acids, salts of sulfonated monovalent alcohol esters, amides of amino sulfonic acids such as the sodium salt of oleyl methyl tauride, sulfonated aromatic hydrocarbon alkali salts such as sodium alpha-naphthalene monosulfonate, condensation products of naphthalene sulfonic acids with formaldehyde, and sulfates such as ammonium lauryl sulfate, triethanol amine lauryl sulfate, and sodium lauryl ether sulfate.

The froth can also be stabilized with nonionic emulsifying agents in addition to the anionic emulsifying agents. Such nonionic emulsifying agents can be illustrated by saponins, condensation products of fatty acids with ethylene oxide such as dodecyl ether of tetraethylene oxide, condensation products of ethylene oxide and sorbitan trioleate, condensation products of phenolic compounds having side chains with ethylene oxide such as condensation products of ethylene oxide with isododecylphenol, and imine derivatives such as polymerized ethylene imine.

The froth can be stabilized by thickening agents, suitable thickeners are commercially available and would be selected for their stability and usability in thickening the emulsion at the pH of the emulsion being used. Some of the useful thickeners include the classes of cellulose derivatives, alkali salts of polyacrylates and polymethacrylates, sodium and ammonium salts of carboxylate copolymers, and colloidal clays. These and other thickeners can be used, but it is advisable that a particular thickener be tried on a small scale to determine that it does not adversely effect the storage stability of the emulsion or the resulting properties of the elastomeric foam.

A particularly useful method of stabilizing the froth is through the use of fibers as a froth stabilizer. The fibers used are fibers which are not adversely effected by the aqueous emulsions, many of which are strongly alkaline. The fibers are more successfully dispersed into the emulsion (A) if their average diameter is less than 10 micrometers and their length is less than 10 mm, preferable the diameter is less than 5 micrometers and the length is less than 8 mm. The smaller the diameter of the fibers and the shorter they are, the easier they are to disperse. Glass fibers having a diameter of about 3 micrometers and an average length of about 4 mm are preferred. The minimum diameter of useful fibers is about 1 micrometre and the minimum length of useful fibers is about 20 micrometres. The fibers must be dispersed in the emulsion in order to be able to dispense the composition from a container without clogging the valve when the composition is dispensed from an aerosol container through a valve. Electrically conductive foams have been produced using graphite fibers and graphite fibers coated with nickel. Fibers which are ductile, rather than brittle like the glass or graphite fibers, have also been used. Stainless steel fibers are more difficult to disperse without clumping than are glass fibers. The ductile fibers bend rather than break during the mixing and dispersion step. The bent fibers tend to become hooked together into clumps which clog the valve. Mixtures of fibers can also be used.

The amount of fibers required to obtain a froth is dependent upon the emulsion (A) that is used as well as the use of any other froth stabilizers in conjunction with the fibers. A range of from 1 to 10 parts by weight of fibers may be necessary to provide froth where the fibers are the only froth stabilizer. A preferred range is from 2 to 5 parts by weight of fibers per 100 parts by weight of emulsion (A).

It is believed that the fibers act as a froth stabilizer in that they reinforce the walls of the cells as the froth is formed. The reinforced cell walls do not collapse as the froth is dried so that a foam is formed by drying the stabilized froth. The fibers also act as a reinforcement in the foam cell walls so that the foam is stiffer and tougher than when fibers are not present. Foams produced with fibers as a froth stabilizer have improved tear strength over those not containing fibers.

A particularly soft and uniformly small cell foam is produced when lauryl alcohol is used as the froth stabilizer in an amount of from 0.1 to 2 parts by weight. Lauryl alcohol is preferably added to emulsion (A) in amounts between 0.2 to 1.5 parts by weight per 100 parts of emulsion (A). This addition thickens the emulsion and stabilizes the froth produced when the mixture is dispersed. Lauryl alcohol has been found to be unique in its ability to produce a froth of uniform, small cells, the individual cells having diameters of about 0.2 to 0.3 mm diameter, whereas foams produced with similar formulations but without the lauryl alcohol have cells varying from 0.10 to 1.5 mm in diameter. The lauryl alcohol produces a froth which does not shrink excessively as it is dried to produce foam. The foam produced has a smoother outer surface than is produced without the lauryl alcohol. The foam is softer when made with the lauryl alcohol than when made without it. Preferred foams made containing lauryl alcohol have cells with diameters of from 0.2 to 0.3 mm, have greater than 30 cells per linear cm, and have a density of less than 200 kg/m$^3$.

Foam can be produced using mixtures of the surfactants, thickeners, and froth stabilizers as desired to obtain different characteristics in the finished foam. For example, a foam can contain both surfactant and lauryl alcohol or surfactant and electrically conductive fibers, or glass fibers and lauryl alcohol. A preferred combination is from 0.2 to 1.5 parts by weight of lauryl alcohol and from 2 to 5 parts by weight of glass fibers having a diameter of less than 5 micrometers and an average length of less than 5 mm. By using fibers and/or lauryl alcohol as froth stabilizer, a very stable froth can be produced. Because of this froth stability, the amount of blowing agent used can be in the upper portion of the useful range, resulting in more expansion of the froth and a lower density foam after removal of the water from the froth. If amounts of blowing agent in the upper portion of the useful range are added to emulsions which do not contain the fibers or lauryl alcohol as froth stabilizer, the froth may expand to a point where it collapses because the cell walls are not stable enough to resist the larger amount of expansion.

The composition, in a container under superatmospheric pressure, is transformed into a froth, when released to atmospheric pressure, by the aerosol propellant (D) that is present in the composition. The aerosol propellant is a substance that is soluble or dispersible in the mixture while it is in the closed container and which is a gas upon release from the closed container into the atmosphere. Superatmospheric pressure is defined as pressure above atmospheric pressure sufficient to contain the composition. Aerosol propellants are well-known in the art. They can be a gas such as nitrogen or nitrous oxide which is under pressure in the can and dispersed through the composition, which then expands the mixture into a froth when the mixture is released into the atmosphere. They can be a material such as isobutane, propane, dichlorodifluoromethane, or trichlorofluoromethane which are liquids while in a closed container under pressure, then expand into a gas when released into the atmosphere. Mixtures of aerosol propellants can also be used in the composition to obtain the desired amount of frothing when the mixture is released to the atmosphere. Aerosol propellants are materials which are liquid or gas under pressure and become gas at atmospheric pressure and ambient temperatures. Useful materials that are liquids under pressure are those which can be liquified at ambient temperature under pressures of less than about 1 megapascal (1.034 MPa=150 psi) because this is a practical, safe upper-pressure limit. Preferred propellants for use in this invention include the hydrocarbons such as isobutane and propane, and the chlorofluorocarbons such as dichlorodifluoromethane and trichlorofluoromethane. Because some propellants such as difluoroethane, difluorochloromethane and dimethylether were found to be unsatisfactory when used by themselves as blowing agents, it is recommended that the blowing agent used be tested for compatibility with the emulsion (A) and froth stabilizer being used in the composition. Another type of propellant which can be used are gases such as nitrogen, nitrous oxide, air, argon, and helium, which are used to pressurize the container without becoming liquified. Nitrogen and nitrous oxide are preferred because they are inert to the mixture and to the container. Air and oxygen can be used if the metal can is protected from oxidation. Carbon dioxide is not acceptable as a propellant because it causes coagulation of the emulsion (A). Compressed gases are used in sufficient amount to give a pressure of from 0.15 to 1.0 megapascal. The compressed gases are not the preferred propellants because the pressure in the container drops as the contents are expelled; therefore, the degree of frothing changes as the contents of the container are discharged. The preferred propellant is from 1 to 20 parts by weight of propane, isobutane, or mixture of propane and isobutane with the most preferred amount from 1.5 to 8. A preferred composition uses a combination of from 0.2 to 1.5 parts by weight of lauryl alcohol and from 1.5 to 8 parts by weight of these preferred propellants. In general, as more propellant is added, the more the mixture froths when released from the closed container. If too much propellant is added, the mixture froths too much and the froth is not stable, that is, the froth collapses, either immediately or as the water is removed.

The composition of this invention produces an open-cell, elastomeric foam by removing the water from the froth. The froth is obtained by dispensing the composition from a closed container having an outlet valve, the composition being under pressure greater than atmospheric while in the container. The composition of the mixture is such that as the mixture is released from the closed container, the mixture expands to form a froth. This composition consists of a mixture of the silicone oil-in-water emulsion discussed above, a propellant discussed above, and optionally, a froth stabilizer as discussed above.

The closed container can be a one-compartment or two-compartment aerosol can such as is well-known in the industry. The outlet valve on the aerosol can is preferably of the type known as a "toggle action" valve. In a one-compartment can, the contents are discharged by turning the can over so that the valve is on the bottom, then opening the valve. Because the viscosity of the mixture in the can is relatively high, this type of valve, which does not use a dip tube, is preferred. With the one-compartment can, the contents of the can are forced out by the pressure exerted by the propellant, which also acts as a blowing agent in this case. In a two-compartment piston type can, the composition is forced out by the propellant in the lower compartment of the can. The composition in the upper part of the can contains propellant which acts as a blowing agent to produce the froth upon release to atmospheric pressure. In some cases, a two-compartment can is desirable because the blowing agent type and amount can be selected to obtain the preferred rate and amount of froth generated while the propellant can be independently selected to produce the preferred pressure inside the can. In a one-compartment can, the blowing agent and propellant are the same so that there is a relationship between the pressure in the can which forces the mixture out and the pressure which forms the froth.

The emulsion (A) which is used in this invention is selected from those discussed above to produce the type of elastomeric foam preferred by the user. In general, an emulsion with a higher viscosity produces a more stable froth. The stability of the froth can be adjusted by the amount of surfactants and/or thickeners present in the emulsion as discussed above. In addition, a froth stabilizer as discussed above can be added.

In a one-compartment aerosol can, the mixture of emulsion and froth stabilizer is placed into the closed container and the outlet valve is crimped in place. A propellant is added to the mixture through the outlet valve or under the valve just prior to crimping, using equipment well-known in the aerosol industry. The container is then placed on a shaker or similar device to mix and disperse the propellant into the rest of the mixture. The propellant also serves as blowing agent.

In a two-compartment piston type can, the mixture of emulsion and froth stabilizer is placed into the inner compartment and the outlet valve is crimped into place. A blowing agent is added to the mixture through the outlet valve or under the valve just prior to crimping. A propellant is then placed in the outer compartment of the can. The propellant in the outer compartment must be at a higher pressure than the blowing agent in the inner compartment because the purpose of the propellant is forcing the contents from the can. The two compartment can allows different materials to be used for the blowing agent and the propellant, whereas the one-compartment can requires one material to perform both functions.

After the mixture is prepared in the can, a froth is formed by dispensing the mixture from the can into a space at atmospheric pressure. The mixture is forced out of the can through the outlet valve because of the pressure from the propellant in the can. The mixture will exit the valve as a liquid which is then expanded into a froth by the blowing agent in the mixture. The expansion can take place slowly if the mixture is of a high viscosity and the blowing agent selected is one with a low vapor pressure. The rate of expansion of a particular mixture can be increased by lowering the viscosity of the mixture, using a higher vapor pressure blowing agent, or using additional blowing agent. Preferably, the ingredients are chosen so that the mixture forms a froth immediately because the amount of froth being produced is easily observed and the valve can be shut when the desired amount of froth is present. If the froth is formed more slowly, it is more difficult to judge how long the valve should be open in order to obtain a desired amount of froth.

The composition can be dispensed onto a surface and allowed to froth freely or it can be dispensed into a space, for instance a crack or a mold, and allowed to fill the space in the crack or assume the shape of the mold. The froth maintains its existence as a froth while the water is removed to produce an open-cell, elastomeric foam.

The water can be removed from the froth by exposing the froth to ambient conditions and allowing the water to evaporate. This simple method of removing the water allows the composition to be used as a foam sealant to fill cracks in a building, for example. Other methods of removing water, such as exposure to heated air, can also be used.

A composition of this invention comprising (A), from 0.2 to 2 parts by weight of lauryl alcohol, and (C), without (D) present as it is in the composition of claim 1, is a stable emulsion which is a useful intermediate in manufacturing silicone foam. Such a composition comprises those ingredients which are mixed and placed into an aerosol container such as described above. The propellant (D) is then introduced into the container under pressure. Such a composition is also useful in a continuous production process. In such a process, this composition is fed into a mixing chamber at a controlled rate. A propellant is also fed into the mixing chamber at the required rate to give the correct ratio for producing the froth. The mixture of this composition and propellant is then continuously discharged from the mixing chamber to form the froth. The froth is dried to produce silicone foam on a continuous basis.

The composition of this invention produces open-cell, elastomeric foam. Because the foam is based upon elastomeric silicone polymers, the foam possesses good heat stability and weatherability when compared to organic based foams. The foam is useful as insulation, lightweight gap filler, and as lightweight sealant. If the known fire retardant additives such as carbon black and platinum are added to the composition, the foam can be made more fire resistant. The foam can be made electrically conductive by addition of carbon black and/or other electrically conductive fillers, including conductive fibers as discussed above, and used as electrical connectors or pressure switches.

The following examples are included for illustrative purposes and should not be construed as limiting the scope of the invention which is properly delineated in the claims. Amounts given as parts or percent are parts by weight or percent by weight.

EXAMPLE 1

A silicone foam, using an aerosol method of producing the froth, was prepared in which the froth was dried at room temperature.

An aqueous silicone emulsion which formed an elastomer upon removal of the water was prepared from 100 parts of an emulsion of hydroxyl endblocked polydimethylsiloxane prepared by anionic emulsion polymerization and having 58 percent polymer in the emulsion, 58 parts of a colloidal silica sol having 15 percent of silica and a pH of about 10, 0.28 part of an emulsion of dibutyltindilaurate having 50 percent of the tin compound, diethylamine, and acrylic thickener. This emulsion (Emulsion A) had about 42 percent by weight solids content, a pH of about 11, a viscosity of about 20 Pa·s at 25° C., and produced a silicone elastomer when the water was removed from the emulsion at room temperature.

The upper portion of a two-compartment aerosol can was filled with 45 g of Emulsion A and 3 g of a 35 percent solution of disodium N-octyldecyl sulfosuccinamate surfactant, and 4 ml of isobutane (specific gravity of 0.599) as blowing agent (100 parts Emulsion A, 2.3 parts surfactant, 5.3 parts blowing agent). The lower portion of the can was filled with about 15 ml of a mixture of 80 percent by weight isobutane and 20 percent by weight propane, as the propellant.

After the can was shaken to thoroughly mix the contents, the valve was opened and the contents discharged as a froth onto a surface. The froth slowly continued to expand for about 1 hour until the outer surface formed a skin. The froth was allowed to dry at room temperature. The cured foam was open-celled, and had a density of about 109 kg/m$^3$.

EXAMPLE 2

A series of compositions containing lauryl alcohol as a froth stabilizer were prepared and placed in aerosol cans for evaluation in making foam.

Emulsions were prepared by mixing together 160 g of Emulsion A, 9 g of the surfactant used in Example 1, and the amount of lauryl alcohol shown in Table I. The viscosity of each mixture was measured with the result shown in Table I. Each of these emulsions were then poured into a one-compartment aerosol can and a valve, "toggle action" type, was sealed onto the can. The can was then charged with the amount of propellant shown in Table I. The contents were shaken thoroughly to mix, then the contents were discharged onto aluminum panels as strips of froth and allowed to dry for about 24 hours to form open-celled foam. The foam density and cell size were then measured with the results shown in Table I. The density was determined by cutting small cubes from the foam, weighing them, measuring their size, and then calculating the density. The densities shown are values obtained by averaging various values obtained at different points in the sample. The densities varied about plus or minus 8 kg/m$^3$ from the average.

The foam made containing lauryl alcohol had smaller, more uniform cells than the foam not containing lauryl alcohol. The foam containing lauryl alcohol was much softer and elastic than the foam not containing the lauryl alcohol. The foam containing lauryl alcohol maintained full expansion during drying with less collapse than the foam not containing lauryl alcohol.

TABLE I

| Composition | | | | | Foam Properties | |
|---|---|---|---|---|---|---|
| Lauryl Alcohol g | Viscosity Pa·s | Propellant kind | ml | Parts | Density kg/m$^3$ | Cell Size mm |
| none | 10.5 | A-31 | 3 | 1.1 | 137 | 0.15–1.5 |
| none | 10.5 | A-31 | 6 | 2.2 | Collapsed | |
| 0.3 | 11.0 | A-70 | 5 | 1.8 | 64 | 0.2–0.3 |
| 0.9 | 14.6 | A-70 | 5 | 1.8 | 35 | 0.2–0.3 |
| 2.1 | 38.4 | A-31 | 3 | 1.1 | 105 | 0.2–0.3 |
| 2.1 | 38.4 | A-31 | 6 | 2.2 | 39 | 0.2–0.3 |

A-31 is isobutane
A-70 is a 50/50 by volume mixture of isobutane and propane.

EXAMPLE 3

A variety of alcohols were evaluated for use as froth stabilizers.

A series of compositions were mixed and placed into aerosol containers as in Example 2 using 45 g of Emulsion A, 3 g of the surfactant of Example 1, 0.2 g of the alcohol shown in Table II and 2 ml of isobutane propellant (100 parts Emulsion A, 2.3 parts surfactant, 0.4 parts alcohol, 2.7 parts propellant). After thorough mixing, the samples were discharged, dried, and evaluated as in Example 2 with the results shown in Table II.

Lauryl alcohol was the only alcohol which was a useful froth stabilizer in that it gave a uniform, small-celled foam with a smooth, uniform surface on the foam. The other alcohols yielded foams which were collapsed with rough irregular surfaces.

TABLE II

| Alcohol | | Density kg/m$^3$ | Cell Size mm | Appearance |
|---|---|---|---|---|
| lauryl | (C$_{12}$) | 48 | 0.2–0.3 | A |
| 1-propyl | (C$_3$)* | 74 | 0.5–2.0 | D |
| octyl | (C$_8$)* | 101 | 0.5–2.0 | D |
| decyl | (C$_{10}$)* | 97 | 0.5–2.0 | D |
| tridecyl | (C$_{13}$)* | 166 | 0.5–2.0 | D |
| furfuryl | (a)* | 72 | 0.5–2.0 | D |

TABLE II-continued

| Alcohol | | Density kg/m³ | Cell Size mm | Appearance |
|---|---|---|---|---|
| benzyl | (b)* | 95 | 0.5–2.0 | D |

(a) is 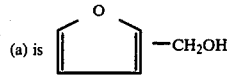 —CH₂OH (b) is  —CH₂OH

A is no collapse, smooth surface
D is partial or complete collapse, rough irregular surface
*Comparative Examples

EXAMPLE 4

Foam was prepared using glass fibers as the froth stabilizer.

A composition was prepared by mixing 43.7 g of Emulsion A with 1.3 g of glass fibers in a mixer until the glass fibers were dispersed throughout the emulsion (100 parts Emulsion A and 3 parts glass fibers). The glass fibers had diameters ranging from 2.6 to 3.8 micrometers and lengths of less than 8 mm with an average of about 4 mm. The composition was then placed in the upper portion of a two-compartment aerosol can, a valve applied, and 2 ml (2.7 parts) of isobutane added as blowing agent. The propellant in the lower portion of the can was 5 ml of the mixture of isobutane and propane used in Example 1.

After mixing, the contents were discharged as a frorh onto a surface. The froth was stabilized by the glass fibers and did not collapse during the drying period at room temperature. After drying, an open-cell foam having walls reinforced with the glass fibers resulted. The foam had a density of about 330 kg/m³ with comparatively large, cells. The foam was tougher and less compressible than a similar foam made without the glass fibers, using lauryl alcohol to stabilize the froth.

A comparative example was prepared as above, but the glass fibers were not added to the composition. When discharged from the aerosol, the composition formed a froth, but the froth was not stable. The froth collapsed on standing and the emulsion dried as a flat film rather than as a foam.

EXAMPLE 5

A foam was prepared using both glass fibers and lauryl alcohol as froth stabilizers.

A composition was prepared by mixing 43.7 g of Emulsion A with 1.3 g of the glass fibers of Example 4, 4.5 g of sodium lauryl sulfate surfactant as a 30 percent by weight solution in water, and 0.3 g of lauryl alcohol (100 parts Emulsion A, 3 parts glass fibers, 0.7 part lauryl alcohol, 10 parts surfactant). After mixing, the composition was placed in an aerosol one-compartment can, the valve applied, and 4 ml (5.5 parts) of isobutane were added as blowing agent and propellant. After mixing, the contents were discharged as a froth onto a surface. The froth, being stabilized by both the glass fibers and lauryl alcohol was very stable and did not collapse. It expanded to a greater extent than in Example 4 because a higher concentration of the blowing agent was present and the froth stabilizers maintained the structure during drying. The foam obtained upon removing the water from the froth by drying at room temperature had a density of 86 kg/m³.

EXAMPLE 6

An electrically conductive foam was prepared by using nickel-coated graphite fibers as the froth stabilizer.

A composition was prepared by mixing 92.2 g of Emulsion A, 9.8 g of sodium lauryl sulfate surfactant, 2.8 g of nickel-coated graphite fibers, and 14.5 g of lampblack (100 parts Emulsion B, 10.6 parts surfactant, 3 parts fibers, 16 parts lampblack). The fibers had a nominal diameter of 8 micrometers and were about 3 mm in length. The composition was placed in an aerosol one-compartment can and a valve applied. The can was charged with 3 ml (1.9 parts) of isobutane as blowing agent and propellant.

The contents were discharged, after mixing, onto a surface as a froth. The froth was dried at room temperature to remove the water and form an open-cell foam. The foam had a surface resistivity of approximately 60 ohms per square.

EXAMPLE 7

A sample was prepared using nitrogen as the blowing agent and propellant.

A composition was prepared by mixing 100 g of Emulsion A, 5 g of the surfactant of Example 2 and 0.6 g of lauryl alcohol (100 parts Emulsion A, 5 parts surfactant, 0.6 part lauryl alcohol). After mixing, the composition was placed in an aerosol can, a valve attached, and the one-compartment can was charged with nitrogen at a pressure of 859 kPa.

The contents were charged onto a surface as a froth. The froth was dried at room temperature to remove the water and form an open-cell foam. The foam had a density of 112 kg/m³ with small, uniform cells of about 0.2 to 0.3 mm diameter.

That which is claimed is:

1. A composition, under superatmospheric pressure, consisting of a mixture of
   (A) 100 parts by weight of silicone emulsion which is an aqueous, oil-in-water emulsion that cures upon drying at ambient temperature to an elastomeric film, the emulsion comprising crosslinked silicone polymer, surfactant, water, and optionally filler, curing agent, thickener, or mixtures thereof, the emulsion having a solids content of from 35 to 80 percent by weight,
   (B) from 0 to 2 parts by weight of lauryl alcohol,
   (C) from 0 to 10 parts by weight of fibers having a diameter of from 1 to 10 micrometers and a length of from 30 micrometers to 10 millimeters with a length to diameter ratio of greater than 10 to 1, and
   (D) sufficient aerosol propellant selected from the group consisting of nitrogen, nitrous oxide, isobutane, propane, dichlorodifluoromethane trichlorofluoromethane, and mixtures thereof, to convert said composition to a froth when released to atmospheric pressure at 25° C., the froth producing an open-cell, elastomeric foam upon removal of water.

2. The composition of claim 1 in which (B) and (C) are zero.

3. The composition of claim 1 in which (B) is from 0.2 to 1.5 parts by weight.

4. The composition of claim 1 in which (C) is from 1 to 10 parts by weight.

5. The composition of claim 3 in which (C) is zero.

6. The composition of claim 4 in which (B) is zero.

7. The composition of claim 4 in which the fibers are glass fibers having a diameter of less than 5 micrometers and an average length of less than 8 millimeters.

8. The composition of claim 4 in which the fibers are electrically conductive.

9. The composition of claim 8 in which the electrically conductive fibers are nickel-coated graphite.

10. The composition of claim 1 in which (B) is from 0.2 to 1.5 parts by weight and (C) is from 2 to 5 parts by weight of glass fibers having a diameter of less than 5 micrometers and an average length of less than 5 millimeters.

11. The composition of claim 1 in which (D) is from 1 to 20 parts by weight of propane, isobutane, or mixture of propane and isobutane.

12. The composition of claim 1 in which (D) is sufficient nitrogen or nitrous oxide to give a pressure of from 0.15 to 1.0 megapascal.

13. The composition of claim 5 in which (B) is from 0.2 to 1.5 parts by weight and (D) is from 1.5 to 8 parts by weight of propane, isobutane, or mixture of propane and isobutane.

14. A composition consisting of
   (A) 100 parts by weight of silicone emulsion which is an aqueous, oil-in-water emulsion that cures upon drying at ambient temperature to an elastomeric film, the emulsion comprising crosslinked silicone polymer, surfactant, water, and optionally filler, curing agent, thickener, or mixture thereof, the emulsion having a solids content of from 35 to 80 percent by weight,
   (B) from 0.2 to 2 parts by weight of lauryl alcohol,
   (C) from 0 to 10 parts by weight of fibers having a diameter of from 1 to 10 micrometers and a length of from 30 micrometers to 10 millimeters with a length to diameter ratio of greater than 10 to 1.

15. An aerosol container whose contents are the composition of claim 1.

16. A one-compartment aerosol container whose contents are the composition of claim 1.

* * * * *